United States Patent [19]

Welz et al.

[11] 4,262,051
[45] Apr. 14, 1981

[54] LAMINATES COMPRISING FILLED POLYOLEFINS AND A THERMOPLASTIC DECORATIVE LAYER, THEIR PREPARATION AND USE

[75] Inventors: Martin Welz, Bad Durkheim; Guenter Boenecke, Ludwigshafen; Rainer Neuberg, Dannstadt-Schauernheim; Erhard Seiler, Ludwigshafen, all of Fed. Rep. of Germany

[73] Assignee: BASF Aktiengesellschaft, Fed. Rep. of Germany

[21] Appl. No.: 78,725

[22] Filed: Sep. 25, 1979

[30] Foreign Application Priority Data

Oct. 12, 1978 [DE] Fed. Rep. of Germany ....... 2844397

[51] Int. Cl.$^3$ .............................................. B32B 5/16
[52] U.S. Cl. ................................. 428/283; 156/308.2; 428/284; 428/286; 428/296; 428/298; 428/300; 428/310; 428/320; 428/323; 428/324; 428/325; 428/332; 428/333; 428/337
[58] Field of Search ............... 428/283, 284, 286, 298, 428/300, 310, 320, 323, 324, 325, 332, 333, 337, 246, 240, 241, 247, 296; 156/308.2

[56] References Cited

U.S. PATENT DOCUMENTS

| | | | |
|---|---|---|---|
| 3,873,409 | 3/1975 | Jehur | 428/261 |
| 3,996,082 | 12/1976 | Leatherman | 428/228 |
| 4,205,113 | 5/1980 | Hermansson et al. | 428/296 |
| 4,207,373 | 6/1980 | Segal | 428/284 |

FOREIGN PATENT DOCUMENTS 2753697 2/1977 Fed. Rep. of Germany.
2650628 11/1978 Fed. Rep. of Germany.

*Primary Examiner*—James J. Bell
*Attorney, Agent, or Firm*—Keil & Witherspoon

[57] ABSTRACT

The invention concerns laminates comprising a filled polyolefin layer and a thermoplastic decorative layer, a process for the preparation of these laminates and the use of the laminates for the production of moldings. Between the outer, polyolefin, layer and the decorative layer the novel laminates contain an adhesion-providing layer comprising a fiber-blend web or fabric containing two or more fusible types of fibers, of which one type welds to one of the outer layers to give a good bond, and another type welds to the other outer layer. If one outer layer of the laminate is a polyolefin, one of the fibers of the web can be polypropylene, and if the other outer layer is PVC, one of the fibers can be PVC. The preferred embodiment is a laminate of polypropylene and PVC, with the web or fabric consisting of polypropylene fibers and PVC fibers.

6 Claims, No Drawings

LAMINATES COMPRISING FILLED POLYOLEFINS AND A THERMOPLASTIC DECORATIVE LAYER, THEIR PREPARATION AND USE

The present invention relates to laminates comprising (a) an outer, base layer of a filled polyolefin, (c) an outer decorative layer of a thermoplastic other than a polyolefin, which inherently has poor adhesion to (a), and (b) an intermediate adhesion-providing layer of a web or fabric.

In such laminates, a good bond is required between the two outer layers or between each outer layer and the intermediate adhesion-providing layer.

To meet these requirements, special hot-melt adhesives have been used. The problem of inadequate heat resistance of the adhesive bond can in such cases be solved by additional measures, such as crosslinking of the adhesive (cf. German Published Application DAS No. 2,753,697). Another conventional method of bonding together thermoplastic layers which have inherently poor adhesion to one another is to anchor the base layer mechanically to a web and then to bond this layer to the decorative layer by means of a reactive adhesive (cf. German Laid-Open Application DOS No. 2,650,628). This process is involved and time-consuming and is unsuitable for rapid continuous bonding. It does not show any advantage over producing a laminate by directly bonding a base layer and a decorative layer with a reactive adhesive.

It is an object of the present invention to provide a laminate which consists of two layers which cannot be welded together to give a good bond, namely (a) an outer, base layer of a filled polyolefin and (c) an outer decorative layer of a thermoplastic other than a polyolefin, the two layers (a) and (c) being bonded very firmly to one another by an intermediate adhesion-providing layer (b).

It is a further object of the invention to bond the two layers (a) and (c) firmly together by a continuous and rapid process.

We have found that these objects are achieved, according to the invention, if the adhesion-providing layer (b) consists of a fiber-blend web or fabric comprising two or more types of fusible fibers, of which one can be welded firmly to one of the outer layers (a) and (c), and another to the other outer layer (a) or (c).

Preferably, the polyolefin of the outer layer (a) and one type of fiber of the fiber-blend web or fabric consists of polypropylene and the outer layer (c) and another type of fiber of the fiber-blend web or fabric consists of polyvinyl chloride.

In a particularly preferred laminate, the polyolefin of the outer layer (a) consists of polypropylene, the outer layer (c) consists of polyvinyl chloride and the fiber-blend web or fabric of the layer (b) consists of polypropylene fibers and polyvinyl chloride fibers.

The above objects are furthermore achieved if, to produce the above laminates, the layer (b) is superficially fused, but not fused completely, before or during bonding of the layers (a) and (c) by application of heat and pressure.

In a preferred process, the layer (b) is first fused onto one of the outer layers (a) and (c), and is only then welded to the second of the outer layers (c) and (a).

The base layer (a) of the laminate consists of a filled polyolefin and is from 0.5 to 8, preferably from 1 to 4, mm thick. Polyolefins for the purposes of the invention means the relevant conventional homopolymers of ethylene and propylene, and copolymers of ethylene and propylene with copolymerizable olefinically unsaturated compounds. In particular, suitable polyolefins are polyethylene having a density of from 0.890 to 0.965 g/cm$^3$ (measured according to DIN 53,479) and a melt index of 0.1 to 20 g/10 min (measured according to ASTM D 1238–65 T at 190° C. under a load of 2.16 kg), polypropylene having a density of from 0.80 to 0.90 g/cm$^3$ and a melt index of from 0.1 to 20 g/10 min (according to ASTM-D 1238–65 T at 230° C. under 2.16 kg load), and mixtures of these polyolefins with one another.

To increase their impact strength, these polyolefins may or may not additionally contain from 1 to 20% by weight of conventional synthetic rubbers or block copolymers of styrene and dienes. These polymers are well known from polymer chemistry and therefore do not require more detailed discussion here. An appropriate conventional isotactic polypropylene is particularly suitable as the polyolefin. Such a material contains from 3 to 10% by weight of non-isotactic polypropylene, which is soluble on boiling with xylene and then cooling to room temperature, the weight ratio of polypropylene to xylene used in the test being 5:95.

The polyolefins are filled with from 10 to 60, preferably from 20 to 50, percent by weight, based on the weight of filled polyolefin, of a conventional solid inert filler. Examples of suitable fillers for use in the polyolefin layer are glass fibers, glass mats, glass beads, talc, chalk, mica and fine particles of wood. Suitable examples of the latter are all commercial types with particles having a length of from 10 to 5,000 μm and a width of from 10 to 2,000 μm. The wood flours may be used in powder form or in a compacted form. In addition to the above fillers, the polyolefin compositions may contain relevant conventional flameproofing agents, agents for improving the impact strength, such as polyethylene of a lower density, stabilizers or scrap materials (regenerated materials).

The decorative layer consists of a thermoplastic polymer different from the polyolefin, and may be polyvinyl chloride (foamed or compact, rigid or plasticized PVC), a PVC which has been modified with styrene copolymers, eg. a styrene-acrylonitrile copolymer, an acrylonitrile-butadiene-styrene copolymer, an acrylonitrile-styrene-acrylic copolymer or a grafted rubber in order to modify the impact strength, or has been modified with a saturated polyester, in order to improve the processability, or a chlorinated polyethylene. Preferably, a plasticized PVC sheet is used, which may be foam PVC in order to produce a softer hand and cushioning effect. Such sheets are commercially available in numerous colors and patterns.

The thickness of these sheets of the layer (c) may be from 0.05 to 2 mm if the sheets are compact and from 0.5 to 5 mm if they are foamed.

For the purposes of the invention, polyvinyl chloride is the polymerization product of vinyl chloride, known from polymer chemistry, which is thermoplastic and has a chlorine content of from 56 to 57 percent by weight and a softening point of from 75° to 80° C. The K value of the polyvinyl chloride is preferably from 70 to 90 (measured according to DIN 53,726). A foamed polyvinyl chloride is an artificially produced lightweight foam having a cellular structure. For the laminates according to the invention, plasticized PVC foams having closed cells and densities of from 0.6 to 1.3 g/cm³ are particularly suitable. The polyvinyl chloride used as the decorative layer (c) is preferably a plasticized PVC. Accordingly it contains a conventional plasticizer for PVC in an amount of from 15 to 40, preferably from 20 to 35, percent by weight based on the weight of plasticized PVC. Examples of suitable plasticizers are tricresyl phosphate, esters of phthalic acid and esters of aliphatic dicarboxylic acids. The plasticized PVC may additionally contain the relevant conventional stabilizers and pigments.

The adhesion-providing layer (b) present between the outer layers (a) and (c) consists of a web or fabric. The former category includes non-woven and non-knitted sheet-like structures of fibrous materials. The fibers therein, the length of which depends on the process of manufacture, are dry-laid or wet-laid in a web-producing machine. Webs of the type used are conventional materials described, for example, in Textilpraxis 1968, No. 3. The fiber-blend webs to be used according to the invention consist of at least two different types of fibers.

For welding to the base layer (a) of filled polyolefin, fibers consisting entirely or predominantly of polyolefins may be used. These fibers are commercially available. If a base layer of filled polypropylene is used, polypropylene fibers are particularly suitable.

For welding to the decorative layer, which consists, for example, of plasticized PVC, fibers which adhere well are all those consisting entirely or partially of polyvinyl chloride (PVC) or polyvinylidene chloride (PVDC), as well as fibers of copolymers and of mixtures of PVC and PVDC. Such fibers are commercially available. Fibers of copolymers of acrylonitrile with vinyl chloride or vinylidene chloride, available commercially as non-flammable fibers, are also suitable. Fibers of blends of PVC with polyesters (containing 50 percent by weight of PVC) also give a good bond when welded to the above decorative layers. For bonding to plasticized PVC, which is the preferred decorative layer, pure PVC fibers are particularly suitable.

The properties and textile data of the fibers employed in the fiber-blend web or fabric may be varied within a wide range. Fibers of from 0.1 to 200 dtex, in the main from 0.5 to 25 dtex, may be employed. Two-component fibers can in many cases also be employed with advantage.

The ratio in which the polyolefin fibers and PVC fibers are mixed must be suited to the requirements of each particular case, and is from 5:95 to 95:5, preferably from 30:70 to 70:30.

The softening points of the various types of fusible fibers may differ from one another by a large amount without interfering with the usefulness of the fiber-blend web. It is a particular advantage of the process according to the invention that even layers with widely differing melting points and/or softening points can be firmly welded to one another, since the fiber-blend web has a good insulating action.

In addition to the two weldable types of fibers, other types of fibers may be added in order to achieve specific properties, for example high-tenacity heat-resistant fibers for absorbing the forces which occur during processing or use, conductive fibers for inductive heating, and crimped fibers for an increased cushioning effect of the decorative layer.

The web is produced in accordance with conventional methods by blending, carding, cross-laying and subsequent mechanical and/or chemical bonding. The properties can be improved by needle-punching. Additional bonding may be achieved in the conventional manner by use of a binder or by a heat treatment.

Fabrics containing at least two different types of fibers can be produced either from fiber blend yarns or by using different yarns in the warp and the filling. The fabric can be suited to particular requirements, for example moldability, by appropriate choice of the yarn denier and of the type of fabric construction.

The fiber-blend webs and fabrics weigh from 15 to 100 g/m², preferably from 20 to 50 g/m². The web or fabric is continuously laminated onto one of the two layers in the conventional manner by application of pressure and heat, or is pressed into the said layer when the latter is being manufactured. In a second process step, the second layer is then welded onto the web or fabric, taking care that the web or fabric does not fuse completely, since this may result in less good properties. It is advantageous in this process if the web or fabric is first welded onto the decorative layer or embedded therein during manufacture of the latter, as this composite material can still be handled easily since it can be wound up.

The fact that the welding process is very rapid compared to the use of reactive adhesives also allows the manufacture of the laminate to be carried out completely continuously.

In such continuous manufacture, the fiber-blend web, which may or may not be heated to 100°–150° C., is introduced between the surface-molten hot base layer of filled polyolefin and the decorative layer which is heated to 100°–150° C. (depending on its heat resistance), and is then welded to the outer layers under pressure, after which the laminate is cooled.

The finished sheet-like material can be converted to moldings by various methods, such as vacuum forming or compressed air forming, folding, bending or pressing, after the material has been appropriately heated. In a variant of these processes, the finished laminate is produced from the base layer and decorative layer only at the stage of molding under pressure. This process especially has the advantage that the base layer and the decorative layer can be heated to different temperatures.

It is an advantage of the process according to the invention that as a result of the felting-together of the two types of fibers of the web or as a result of the construction of the fabric, the forces are transmitted from the fibers welded to the base layer to the fibers welded to the decorative layer. The adhesion of the fibers to these layers results predominantly from welding and only to a lesser degree from mechanical anchoring.

EXAMPLE 1

5 dtex polypropylene fibers of length 50 mm and 6 dtex PVC fibers of length 70 mm (Thermovyl from Rhodiaceta) in a weight ratio of 60:40, are converted to a web weighing 35 g/m².

This web is welded to a 2.0 mm thick sheet of foamed plasticized PVC by heating the web and the back of the PVC sheet to 130° C., pressing them together between cold rollers and fixing the bond by cooling.

The base material—a polypropylene filled with 40 percent by weight of fine wood flour—is extruded and pressed to 2.5 mm thick sheets by passing through a polishing calender. Before entering the calender, the assembly to be laminated, comprising the PVC sheet and the fiber-blend web, is applied to the base material, and the heat of the surface-molten base, which is at 190°, suffices partially to melt the polypropylene fibers in the web, which then weld under pressure, in the nip, to the base consisting of wood flour-filled polypropylene. The adhesion of the PVC sheet to the base, measured by the peel test, is 3.1 N/mm. The total thickness of the laminate sheet material is 4.4 mm, due to the slight compression of the sheet of foam.

EXAMPLE 2

5 dtex polypropylene fibers having a length of 60 mm and 7 dtex fibers having a length of 70 mm, of a mixture of 70 parts of PVC and 30 parts of a thermoplastic polyester based on neopentylglycol terephthalate are converted, in a weight ratio of 40:60, to a web weighing 40 g/m². This web is continuously laminated to a plasticized PVC sheet by heating the sheet and the web, pressing them together between two rollers and then cooling the laminate.

The base material—a polypropylene filled with 30 percent by weight of chalk—is extruded and pressed to 3.5 mm thick sheets by passing through the polishing calender. Before entering the calender, the laminated material described in the preceding paragraph is fed onto the base material, and the heat of the surface-molten base suffices partially to melt the PP fibers in the web, which then weld to the filled polypropylene under pressure in the nip.

EXAMPLE 3

A fiber-blend web of 40% of 4.0 dtex polypropylene fibers, 40% of 5 dtex fibers of a copolymer of vinyl chloride and acrylonitrile containing 60% of vinyl chloride units, and 20% of 8 dtex nylon 6,6 fibers, added to increase the stability, is produced in the conventional manner and then needle-punched with 10 perforations per cm². The web is then welded to a PVC foam sheet by pressure and heat.

A polypropylene filled with 35 percent by weight of wood flour is extruded to give 3.0 mm thick sheets. During polishing, the laminating sheet, carrying the web, is pressed onto the polypropylene sheet base material and at the same time welded thereto. Blanks are punched out of the finished sheet-like material, heated to the molding temperature by means of an infrared radiator, and pressed into a mold by means of compressed air.

We claim:

1. A laminate comprising (a) an outer, base layer having a thickness of from 0.5 to 8 mm of a polyolefin, filled with from 10 to 60 percent by weight, based on the weight of filled polyolefin, of a solid inert filler, (c) an outer decorative layer having a thickness of from 0.05 to 5 mm of a thermoplastic other than a polyolefin, which inherently has poor adhesion to (a), and (b) an intermediate adhesion-providing layer of a web or fabric, wherein the adhesion-providing layer (b) consists of a fiber-blend web or fabric comprising two or more types of fusible fibers, of which one can be welded firmly to one of the outer layers (a) or (c), and another to the other outer layer (a) or (c).

2. A laminate as set forth in claim 1, wherein the polyolefin of the outer layer (a) and one type of fiber of the fiber-blend web or fabric consists of polypropylene.

3. A laminate as set forth in claim 1, wherein the outer layer (c) and one type of fiber of the fiber-blend web or fabric consists of polyvinyl chloride.

4. A laminate as set forth in claim 1, wherein the polyolefin of the outer layer (a) consists of polypropylene, the outer layer (c) consists of polyvinyl chloride and the fiber-blend web or fabric of the layer (b) consists of polypropylene fibers and polyvinyl chloride fibers.

5. A process for the preparation of a laminate as set forth in claim 1, wherein the surface area of layer (b) is fused but not the entire layer, before or during bonding of the layers (a) and (c) by application of heat and pressure.

6. A process for the preparation of a laminate as claimed in claim 1, wherein the layer (b) is first fused onto one of the outer layers (a) and (c) and only thereafter is welded to the second outer layer (c) or (a).

* * * * *